United States Patent
Luo

(10) Patent No.: US 8,492,451 B2
(45) Date of Patent: Jul. 23, 2013

(54) ULTRAVIOLET INK FOR SURFACE PRINTING

(75) Inventor: Lucky Luo, Shenzhen (CN)

(73) Assignee: Shenzhen Sangfei Consumer Communications Co., Ltd, Shenzhen (CN)

( * ) Notice: Subject to any disclaimer, the term of this patent is extended or adjusted under 35 U.S.C. 154(b) by 48 days.

(21) Appl. No.: 13/257,310

(22) PCT Filed: Dec. 21, 2009

(86) PCT No.: PCT/CN2009/075793
§ 371 (c)(1),
(2), (4) Date: Dec. 15, 2011

(87) PCT Pub. No.: WO2010/075740
PCT Pub. Date: Jul. 8, 2010

(65) Prior Publication Data
US 2012/0083546 A1    Apr. 5, 2012

(30) Foreign Application Priority Data
Dec. 29, 2008  (CN) .......................... 2008 1 0241904

(51) Int. Cl.
C08F 2/50 (2006.01)
C08F 2/46 (2006.01)
C08F 2/48 (2006.01)
A61L 2/08 (2006.01)
A61K 6/083 (2006.01)
C08J 7/04 (2006.01)

(52) U.S. Cl.
USPC .............. 522/33; 522/79; 522/109; 427/487; 427/508; 427/511; 427/517

(58) Field of Classification Search
USPC .............. 522/33, 109, 79; 427/487, 508, 511, 427/517
See application file for complete search history.

(56) References Cited

U.S. PATENT DOCUMENTS

2003/0044584 A1* 3/2003 Wachi et al. .................. 428/195
2005/0241949 A1* 11/2005 Crouse .......................... 205/118
2009/0170018 A1* 7/2009 Kuramoto et al. ........ 430/108.22

FOREIGN PATENT DOCUMENTS
WO    WO 2008-140272    * 11/2008

* cited by examiner

Primary Examiner — Michael Pepitone
Assistant Examiner — Jessica Roswell

(57) ABSTRACT

This patent application relates to an ultraviolet ink for surface printing. The ultraviolet ink includes: between 10% to 30% by weight of n-butyl acetate, between 10% to 30% by weight of acrylic resin, between 20% to 40% by weight of polyvinyl chloride urethane resin, between 15% to 35% by weight of monomer and between 3% to 8% by weight of photoinitiator. The advantages of using the ultraviolet ink made by the above-mentioned formula for plastic UV spraying surface printing include high wear resistance, hard to fall off, simplified preparation process and lower production cost.

6 Claims, No Drawings

ULTRAVIOLET INK FOR SURFACE PRINTING

FIELD OF THE PATENT APPLICATION

This patent application relates generally to a printing ink and more particularly to an ultraviolet (UV) ink for surface printing.

BACKGROUND

Since the development of the surface treatment industry, the UV surface printing technology has been used in shell materials of cell phone by more and more companies. For example, the shell materials of cell phone of Nokia, Motorola and Sony-Ericsson and etc use the UV surface printing technology for printing LOGO or patterns. In the existing technology, the method is to print a UV-curable transparent clear paint over the oxidative polymerization drying oleiferous ink and use the UV light irradiation for drying. The method has the oleiferous ink's excellent printability and ease operation and time saving by UV curing. However, the oil ink needs long time to solidify so the luster of the printed matter by this method will be degraded. Furthermore, parts of the heavy metals and the solvent of oil needed by this oxidative polymerization drying oleiferous ink will residue in the printed matter and pollute the environment. In addition, if the drying is not sufficient, the wear resistance of the ink is bad and the printed LOGO on the surface of the plastic shell will be worn off. This will seriously damage the image of the shell shape.

SUMMARY

The patent application aims to provide an ultraviolet ink for surface printing with high adhesion and wear resistance.

The patent application provides an ultraviolet ink for surface printing comprising: between 10% to 30% by weight of n-butyl acetate; between 10% to 30% by weight of acrylic resin, between 20% to 40% by weight of polyvinyl chloride urethane resin, between 15% to 35% by weight of monomer and between 3% to 8% by weight of photoinitiator, wherein the monomer contains acrylic acid and methacrylic acid.

In an embodiment of the present patent application, the Ultraviolet ink for surface printing further comprises a solvent containing: between 70% to 80% by weight of cyclohexanone, between 15% to 20% by weight of esters solvent and between 5% to 10% by weight of diisobutyl ketone.

In an embodiment of the present patent application, the Ultraviolet ink for surface printing comprises: 75.7 by weight of solvent of acrylic resin, polyvinyl chloride urethane resin, acrylic acid, methacrylic acid, photoinitiator; 9.2% by weight of n-butyl acetate; 10.6% by weight of cyclohexanone; 3% by weight of esters solvent and 1.5% by weight of diisobutyl ketone.

In an embodiment of the present patent application, the Ultraviolet ink for surface printing o comprises: between 20% to 30% by weight of acrylic resin, between 32.5% to 42.5% by weight of polyvinyl chloride urethane resin, between 26.25% to 36.25% by weight of acrylic acid, methacrylic acid and between 2.35% to 9.25% by weight of photoinitiator.

In an embodiment of the present patent application, the Ultraviolet ink for surface printing further comprises: stabilizer, leveling agent, defoamer, dispersant and wax.

In an embodiment of the present patent application, the photoinitiator is hydroxyl cyclohexyl phenyl ketone.

Comparing with the current technology, the advantages of using the ultraviolet ink made by the above-mentioned formula for plastic UV spraying surface printing include high wear resistance, hard to fall off, simplified preparation process and lower production cost.

DETAILED DESCRIPTION

Embodiment 1

An ultraviolet ink for surface printing includes: 12% by weight of n-butyl acetate, 28% by weight of acrylic resin, 35% by weight of polyvinyl chloride urethane resin, 20% by weight of acrylic acid and 5% by weight of photoinitiator.

The printing ink used for surface printing further includes a solvent contain: 78% by weight of cyclohexanone, 15% weight of esters solvent and 7% by weight of diisobutyl ketone.

The printing ink used for surface printing includes: 75.7% by weight of solvent of acrylic resin, polyvinyl chloride urethane resin, acrylic acid and photoinitiator; 9.2% by weight of n-butyl acetate; 10.6% by weight of cyclohexanone; 3% by weight of esters solvent and 1.5% by weight of diisobutyl ketone.

In a preferred embodiment, the printing ink used for surface printing includes: 25% by weight of acrylic resin, 40% by weight of polyvinyl chloride urethane resin, 30% by weight of acrylic acid and 5% by weight of photoinitiator.

In an embodiment of the patent application, the photoinitiator is hydroxyl cyclohexyl phenyl ketone. The monomer which contains acrylic acid and methacrylic acid is a kind of additive in the printing ink. The chemical ID of the esters solvent is 041556-26-7. The printing ink further contains stabilizer, leveling agent, defoamer, dispersant and wax.

In the present patent application, the stabilizer is used for reducing thermal polymerization and improving the storage stability of the printing ink. The stabilizer can be hydroquinone, mequinol, benzoquinone or 2,6-ditertbutylcresol, and etc. The leveling agent is used to improve the leveling of printing ink layer, prevent producing shrinkage cavity, make the surface of printing ink smooth and increase luster of printing ink. The current existing leveling agent can be adopted. The defoamer is used to improve the leveling of printing ink layer, prevent producing shrinkage cavity, make the surface of printing ink smooth and increase luster of printing ink. The dispersant can wet the pigment and binder of the printing ink to make the pigment disperse well and shorten the grinding time. The dispersant can also reduce the amount of oil absorption of the pigment to produce high concentration printing ink and prevent the condensing and precipitating of the pigment granule of the printing ink. The dispersant is generally a surface active agent. The wax is used to improve leveling, water resistance and printing performance of the printing ink (for example adjusting the viscosity). The wax can reduce rubbing dirty and paper lints, and produce a smooth cere on the surface of dried printing ink film to improve the abrasive resistance of presswork. In the ultraviolet ink, the wax can also isolate air, reduce the effect of oxygen inhibitor and benefit the surface curing. However, if the wax is added too much or the wrong wax is chosen, the luster of printing ink will be reduced, the transfer performance of the printing ink will be destroyed and the time of drying will be extended. The leveling agent, defoamer, dispersant and wax in the present patent application can adopt the current existing products.

In one embodiment of the present patent application, the method of making the printing ink includes the following steps:

(1) mixing and stirring the printing ink with above-mentioned proportions and the stabilizer evenly to get a well-distributed printing ink;
(2) adding a certain amount of the esters solvent into the well-distributed printing ink;
(3) diluting the printing ink and printing the printing ink on the plastic shell surface within four hours; and
(4) putting the printed product into an oven of 60☐ to 85☐ and baking for 20 minutes to 40 minutes, solidifing it by ultraviolet light with solidify energy of 500±100 mj/m$^2$ for one minute to five minutes.

The performance test results of the product made by the above method are listed as follows:

| Performance | Test method | Test results | Judgment |
| --- | --- | --- | --- |
| RCA wear resistance | Norman RCA#71BB Abrasion tester (load 175 g), 250 cycles | Bottom not exposed | Pass |
| Thermal and cold shock | −40° C. × 30 Minutes, 85° C. × 30 Minutes, 32 cycles | No abnormal in printing LOGO | Pass |
| High temperature and high humidity | 70° C. × 95% RH, 48 H | No abnormal in printing LOGO | Pass |
| Artificial sweat | Acid PH = 2.6, 60° C., 90% humidity, 48 H | No abnormal in printing LOGO | Pass |
| | Basic PH = 8.8, 60° C., 90% humidity, 48 H | No abnormal in printing LOGO | |
| Salt spray test | 35° C., 85% RH, 5% NaCL, 48 H | No abnormal in printing LOGO | Pass |

Embodiment 2

For simplicity, the same portion between the embodiment 1 and the embodiment 2 are not discussed below. Only the difference between the embodiment 1 and the embodiment 2 are discussed detail below.

The printing ink of this embodiment of the present patent application includes: 28% by weight of n-butyl acetate, 12% by weight of acrylic resin, 20% by weight of polyvinyl chloride urethane resin, 30% by weight of methacrylic acid and 10% by weight of photoinitiator.

The printing ink in one embodiment further includes a solvent containing: 70% by weight of cyclohexanone, 20% by weight of esters solvent and 10% by weight of diisobutyl ketone.

The printing ink in one embodiment includes: 75.7 by weight of solvent of acrylic resin, polyvinyl chloride urethane resin, methacrylic acid and photoinitiator, 9.2% by weight of n-butyl acetate, 10.6% by weight of cyclohexanone, 3% by weight of esters solvent and 1.5% by weight of diisobutyl ketone.

In a preferred embodiment, the printing ink includes: 30% by weight of acrylic resin, 32.5% by weight of polyvinyl chloride urethane resin, 35% by weight of methacrylic acid and 2.5% by weight of photoinitiator.

The performance of the printing ink of this embodiment is same as that of the printing ink of embodiment 1.

Embodiment 3

For simplicity, the same portion between the embodiment 1 and the embodiment 3 are not discussed below. Only the difference between the embodiment 1 and the embodiment 3 are discussed detail below.

The printing ink of this embodiment of the present patent application includes: 20% by weight of n-butyl acetate, 20% by weight of acrylic resin, 30% by weight of polyvinyl chloride urethane resin, 20% by weight of crylic acid and 10% by weight of photoinitiator.

The printing ink in one embodiment further includes a solvent containing: 75% by weight of cyclohexanone, 18% by weight of esters solvent and 7% by weight of diisobutyl ketone.

In one embodiment of the present patent application, the printing ink includes: 75.7% by weight of solvent of acrylic resin, polyvinyl chloride urethane resin, acrylic acid and photoinitiator, 9.2% by weight of n-butyl acetate, 10.6% by weight of cyclohexanone, 3% by weight of esters solvent and 1.5% by weight of diisobutyl ketone.

In a preferred embodiment, the printing ink includes: 20% by weight of acrylic resin, 42% by weight of polyvinyl chloride urethane resin, 30% by weight of acrylic acid and 8% by weight of photoinitiator.

The performance of the printing ink of this embodiment is same as that of the printing ink of embodiment 1.

What is claimed is:

1. An ultraviolet ink for surface printing comprising: between 10% to 30% by weight of n-butyl acetate; between 10% to 30% by weight of acrylic resin, between 20% to 40% by weight of polyvinyl chloride urethane resin, between 15% to 35% by weight of monomer and between 3% to 8% by weight of photoinitiator, wherein the monomer contains acrylic acid and methacrylic acid.

2. The ultraviolet ink for surface printing of claim 1 further comprising a solvent containing: between 70% to 80% by weight of cyclohexanone, between 15% to 20% by weight of esters solvent and between 5% to 10% by weight of diisobutyl ketone.

3. The ultraviolet ink for surface printing of claim 1 comprising: 75.7% by weight of solvent of acrylic resin, polyvinyl chloride urethane resin, acrylic acid, methacrylic acid, photoinitiator; 9.2% by weight of n-butyl acetate; 10.6% by weight of cyclohexanone; 3% by weight of esters solvent and 1.5% by weight of diisobutyl ketone.

4. The ultraviolet ink for surface printing of claim 3 comprising: between 20% to 30% by weight of acrylic resin, between 32.5% to 42.5% by weight of polyvinyl chloride urethane resin, between 26.25% to 36.25% by weight of acrylic acid, methacrylic acid and between 2.35% to 9.25% by weight of photoinitiator.

5. The ultraviolet ink for surface printing of claim 4 further comprising: stabilizer, leveling agent, defoamer, dispersant and wax.

6. The ultraviolet ink for surface printing of claim 5, wherein the photoinitiator is hydroxyl cyclohexyl phenyl ketone.

* * * * *